Jan. 24, 1956

C. C. DUBBS 2,731,699

APPARATUS FOR MAKING CONCRETE PRODUCTS

Filed April 21, 1950

INVENTOR.
Carbon C. Dubbs
BY
Gary Desmond & Parker
Attys.

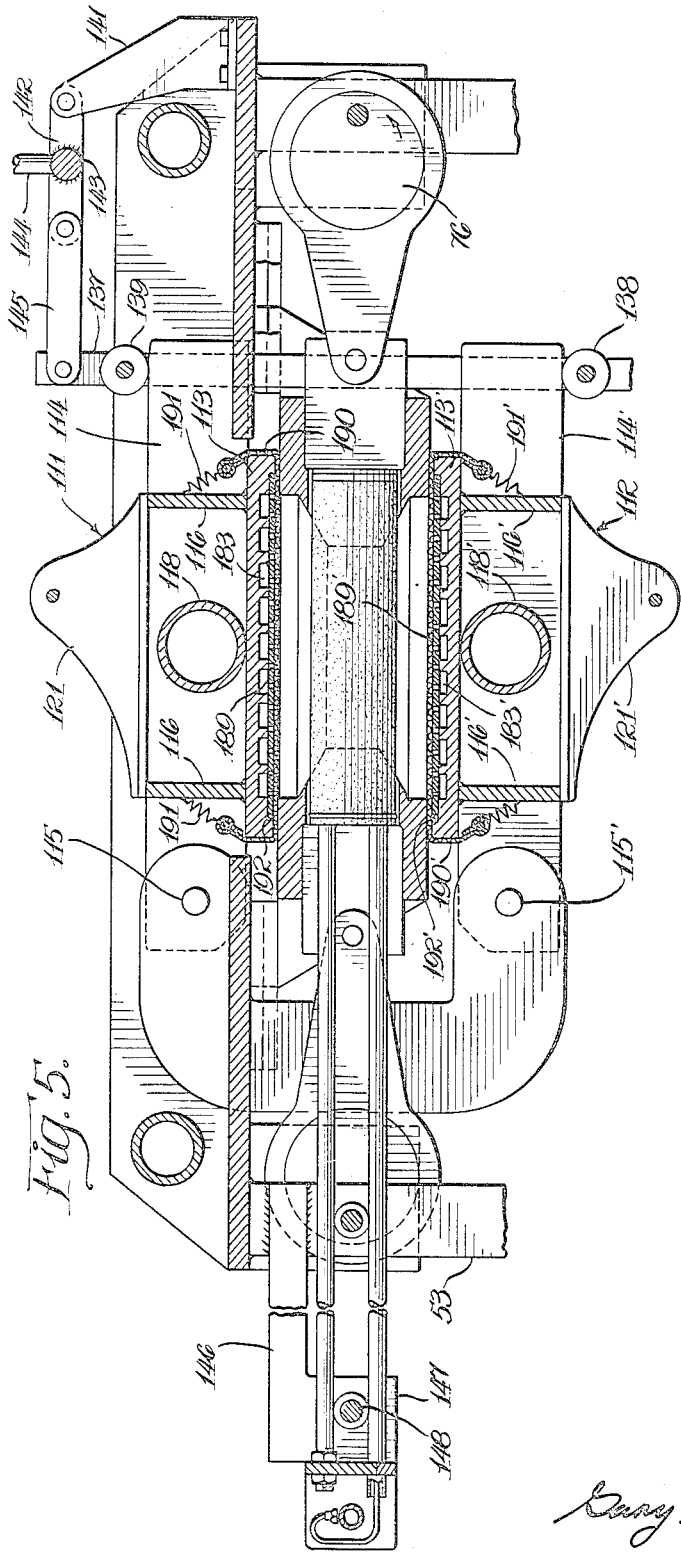
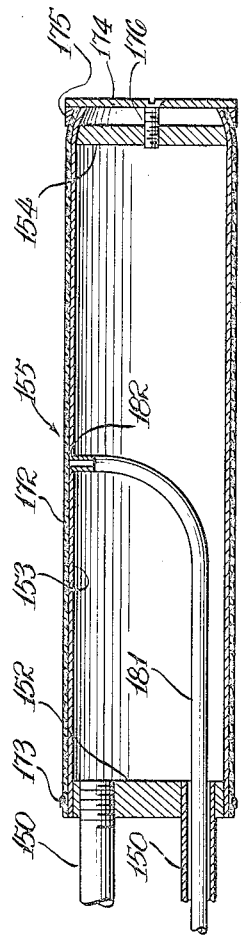
Fig. 5.
Fig. 6.
INVENTOR.
Carton C. Dubbs
BY

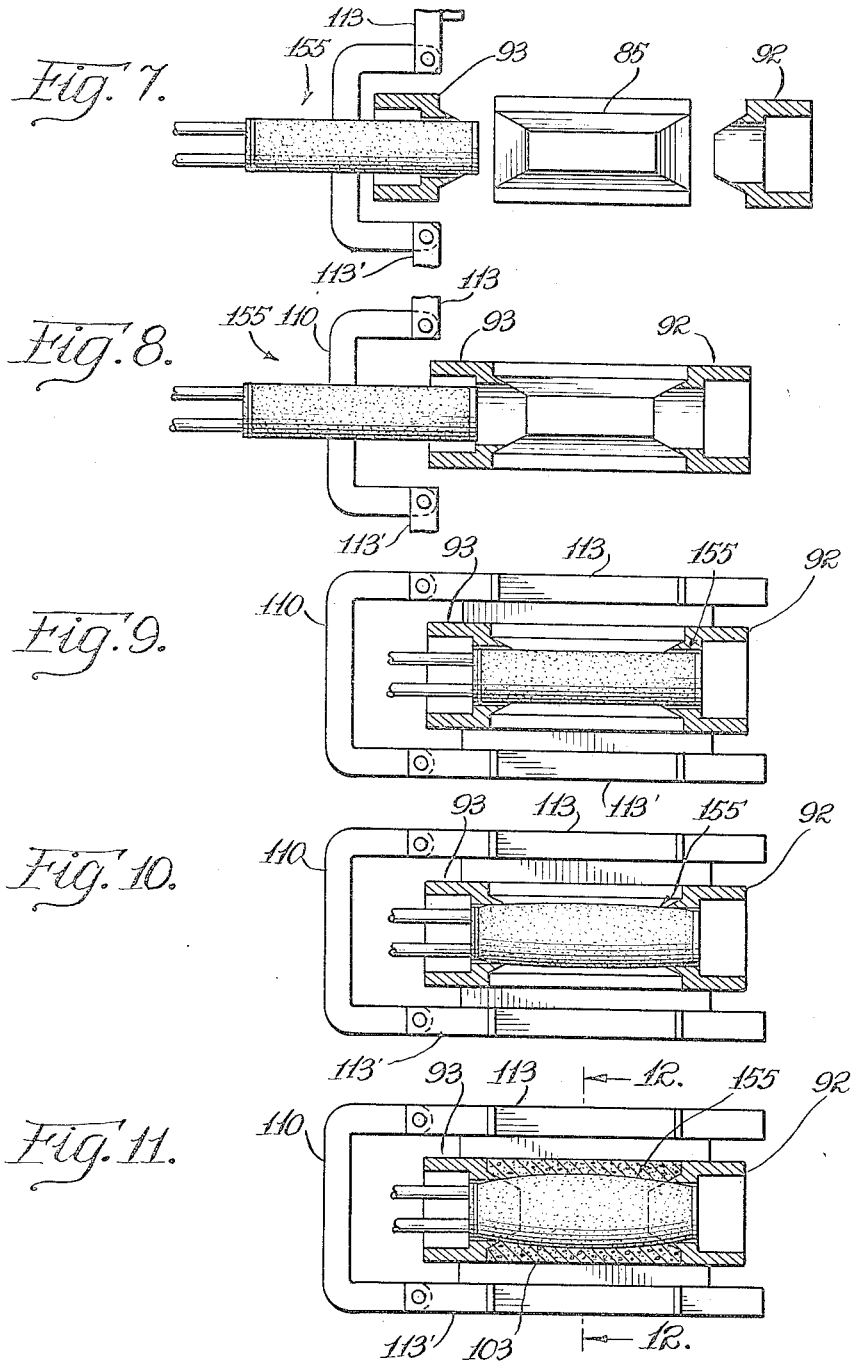

Jan. 24, 1956   C. C. DUBBS   2,731,699
APPARATUS FOR MAKING CONCRETE PRODUCTS
Filed April 21, 1950   7 Sheets-Sheet 7
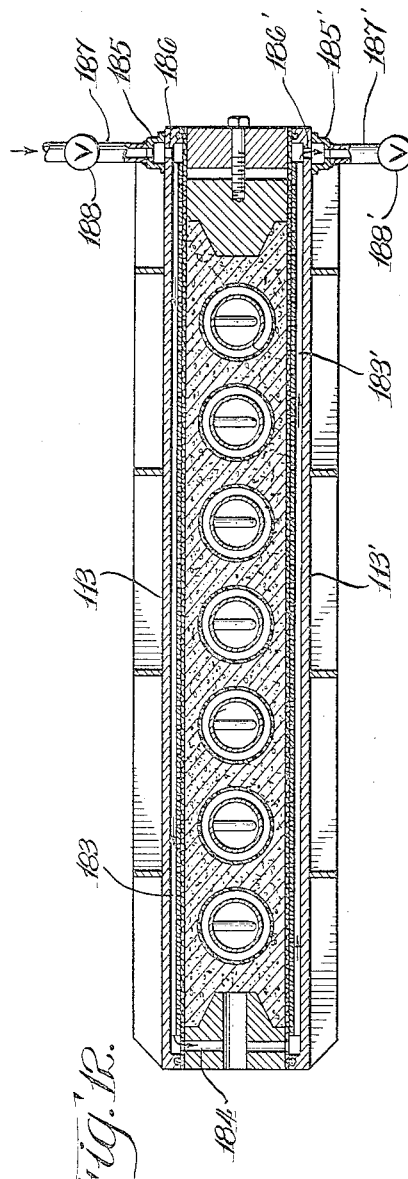
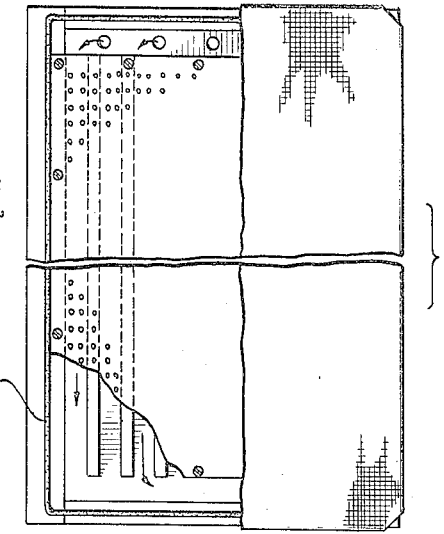
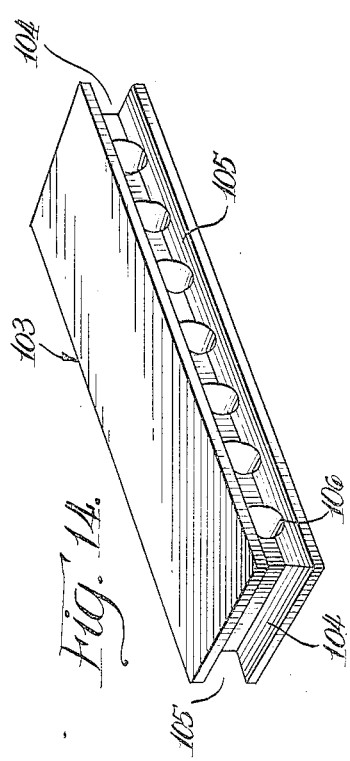
INVENTOR.
Carlton C. Dubbs
BY
Gary Desmond & Parker
Atty's.

United States Patent Office 2,731,699
Patented Jan. 24, 1956

2,731,699

APPARATUS FOR MAKING CONCRETE PRODUCTS

Carbon C. Dubbs, Orange, Calif., assignor to Carbon P. Dubbs, Chelston, Paget East, Bermuda Application April 21, 1950, Serial No. 157,343

5 Claims. (Cl. 25—41)

This invention relates to improvements in apparatus for making molded concrete products particularly of block types, and refers specifically to a method and apparatus for making accurately dimensioned, uniformly finished, strong concrete products in a rapid, efficient manner.

In processes and apparati heretofore proposed for making molded concrete shapes or articles such, for instance, as concrete building blocks, it has been substantially impossible to economically mold such shapes or blocks to accurate dimensions.

In constructing a building of molded concrete blocks employing blocks made by processes and apparati heretofore proposed, inaccuracies in dimensions are compensated for in leveling and squaring the courses by a skilled mason who employs varying thicknesses of mortar between the blocks. As a matter of fact, a considerable portion of a mason's skill resides in his ability to maintain the courses level and square, for to accomplish this result requires considerable care and vast experience. Moreover, the use of such blocks requires, as a necessity, so-called mortar joints, as distinguished from that form of construction wherein the blocks are laid in edge-to-edge contact.

In my invention, blocks may be constructed with dimensions so accurate and uniform that after a leveled and squared foundation has once been established, the courses may be laid with the blocks edge-to-edge without departing materially from the established levels or plumb lines. In addition, the blocks may be laid in this desirable fashion very rapidly by a comparatively unskilled workman.

It is understood in the art that for a predetermined cement and aggregate the strength of the concrete depends materially upon the water content of the concrete mixture during the setting of the mixture. A water content above or below a predetermined amount results in a concrete which departs more or less in strength from the maximum. However, depending upon the concrete shape desired, with particular reference to molded shapes, the squareness of edges, the forming of indentations and projections in a clean-cut manner and the over-all finish desired, the consistency, which depends primarily upon water content, must be such as lends workability to the mixture and, hence, more water than is ideally necessary frequently must be employed. In most instances this excess water remains in the mixture, and in the case of molded articles, demolding cannot take place until preliminary setting has occurred.

In my invention the concrete mixture employed is exceedingly fluid, the mix containing a large excess of water, whereby sharp corners and excellent finish may be obtained. The fact of relatively high fluidity of the mixture permits convenient movement of the mixture to a mold and accurate conformation of the mix with all defining surfaces of the mold. Hence, in the case of a building block an accurately dimensioned block may readily be secured. In addition, the finish of the block surfaces is both desirably uniform and smooth.

The use of a highly fluid mix is permissible in my process and apparatus because the large excess of water employed is subsequently expressed under pressure from the mix within the mold whereby compaction of the mix occurs, the compacted mix containing approximately the ideal water content. This operation is clearly described in my copending applications for patent, Serial Numbers 121,802, 123,656 and 128,975 filed respectively on October 17, 1949, October 26, 1949, and November 23, 1949 since issued into Patents Nos. 2,650,412, 2,650,409 and 2,528,643, respectively.

Compaction of the mix within the mold by pressure and vacuum, which latter is also contemplated in my invention, permits substantially immediate demolding, the block or other article being self-supporting when carried by a suitable pallet, that is, the block has no tendency to slump and change shape or dimensions.

Other objects and advantages of my invention will be apparent from the accompanying drawings and following detailed description.

In the drawings, Fig. 1 is a diagrammatic elevational view of my device parts being broken away and parts being shown in section.

Fig. 5 is an enlarged transverse sectional view taken on line 5—5 of Fig. 4.

Fig. 6 is an enlarged longitudinal detailed sectional view of one of the expanding tubes employed in my invention.

Figs. 7 to 11 inclusive are diagrammatic views taken substantially transversely through the molding section of the machine illustrating the sequential operation of various of the parts constituting the molding section.

Fig. 12 is an enlarged detailed longitudinal sectional view taken through a portion of the molding section of the machine illustrating particularly the ducts or channels for the removal of excess water from the molded product.

Fig. 13 is an enlarged detailed view of one of the face closures for the mold, parts being broken away to show the components of said closure.

Fig. 14 is a perspective view of a concrete product made in accordance with the process and upon the machine constituting my invention.

Figure 1:
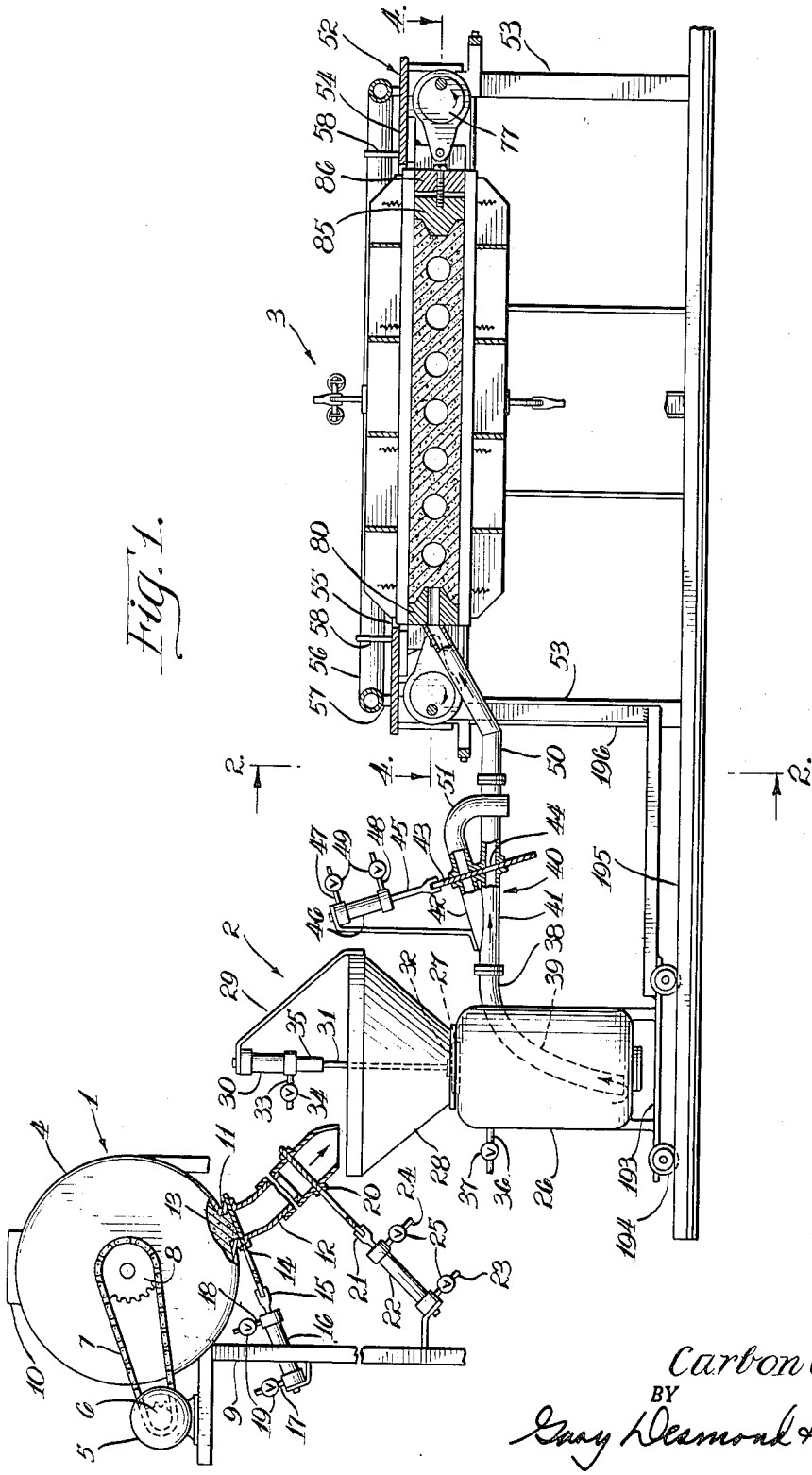

Referring in detail to the drawings, the machine constituting a portion of my invention is illustrated in Fig. 1, parts of the machine being shown diagrammatically and parts of the machine being deleted for purposes of clarity of illustration. Essentially the apparatus comprises three primary elements, a concrete mixer 1, a delivery or pressure chamber 2 and a molding section 3.

The mixer 1 comprises a conventional concrete mixer having a drum 4 within which are provided rotating paddles or vanes (not shown) which are driven by a motor 5, the shaft of which carries a sprocket wheel 6 over which a sprocket chain 7 is trained, the sprocket chain functioning to drive sprocket wheel 8 which in turn manipulates the blades or vanes within the mixer. The mixer proper together with the motor 5 may be mounted upon a suitable frame structure 9. The drum 4 is provided with a filling opening 10 into which the components of the concrete mix may be charged.

The drum 4 is provided with a discharge opening 11 and carries a discharge conduit 12 through which the mixed concrete 13 may be discharged from the mixer. In order to control the discharge of concrete 13 from the drum 4 a conventional slide valve 14 is interposed in the upper end of conduit 12, the valve 14 being manipulated by plunger 15 of a pneumatic cylinder 16. The cylinder 16 is connected to pipes 17 and 18 at its opposite ends, valves 19 being disposed in each pipe to control the passage of fluid under pressure to and from the selected ends of the cylinder 16 whereby the valve 14 may be opened or closed. Adjacent the opposite end of conduit 12 a second slide valve 20 is positioned, said valve being similar to the valve 14 and being manipulated by plunger 21 which operates in pneumatic cylinder 22. The cylinder 22 is provided with pipes 23 and 24 at opposite ends thereof for the introduction or removal of fluid under pressure to the desired ends of the cylinder, the pipes 23 and 24 being controlled by valves 25.

The arrangement is such, as will be hereinafter more fully described, that a predetermined quantity or volume of mixed concrete 13 is periodically discharged into the delivery receptacle 2 from the mixer 4. This operation is accomplished by maintaining slide valve 20 in closed position and opening slide valve 14. A quantity of concrete 13 will thereupon move into that portion of conduit 12 between valves 20 and 14. When the conduit is filled valve 14 is closed and valve 20 is opened thereby discharging a desired quantity or volume of concrete into the receptacle 2.

The delivery receptacle comprises a tank 26 provided at its upper end with a charging opening 27. Mounted upon the upper portion of the tank 26 is a hopper 28 which is adapted to receive the concrete mix discharged from the conduit 12. A supporting bracket 29 is carried by the hopper 28 and, in turn, carries a pneumatic cylinder 30. A rod 31 constitutes an extension of the plunger of cylinder 30 and carries at its lowermost end a valve 32 which when the rod 31 is moved upwardly functions to seat in the opening 27. A pipe 33 connects into the lower portion of the cylinder 30, said pipe having interposed therein a valve 34 whereby the introduction of fluid under pressure from a suitable source (not shown) may be controlled. The rod 31 is spring biased, a spring (not shown) being positioned in housing 35. The arrangement is such that when fluid under pressure is introduced into cylinder 30 through pipe 33 rod 31 is raised against the compressive force of the spring positioned in housing 35, the upward movement of rod 31 functioning to close valve 32. When the fluid pressure within the lower portion of cylinder 30 is relieved the spring carried in housing 35 functions to move rod 31 downwardly and open valve 32.

In carrying out my invention when the desired measured charge of concrete is delivered to the hopper 28 valve 32 is maintained in open position. After the concrete mixture has been introduced into the interior of tank 26 fluid under pressure is introduced into the lower portion of cylinder 30 and valve 32 is thereby closed. A pipe 36 connects into the upper portion of tank 26, said pipe being controlled by valve 37. Pipe 36 is connected to a suitable source of fluid under pressure and by the proper manipulation of valve 37 said fluid under pressure is introduced into the upper portion of the interior of tank 26.

A discharge pipe 38 connects into the upper portion of tank 26, within the tank said pipe extends downwardly as indicated at 39 in Fig. 1, the mouth of the pipe opening adjacent the lower portion of the tank. At its outer end pipe 38 connects with a selector valve 40 which comprises a relatively straight pipe section 41 and a branch section 42 the pipes being joined together in substantially Y-formation. A slide valve 43 provided with an opening 44 extends through both pipe sections 41 and 42, the slide valve being connected to plunger 45 of fluid pressure cylinder 46. Pipes 47 and 48 connect into respectively the upper and lower ends of cylinder 46 whereby fluid under pressure from any suitable source (not shown) may be introduced into the upper or lower portion of the cylinder 46 by the proper manipulation of valves 49 interposed in each of the pipes 47 and 48. The straight section 41 of the selector valve 40 connects with pipe 50 whereby effective connection may be made between pipe 50 and the interior of tank 26. Section 42 connects with a discharge pipe 51 whereby excess concrete may be removed from tank 26 by the proper manipulation of valve 43.

As will be hereinafter more fully described, with superatmospheric pressure established in the upper portion of tank 26 the relatively fluid concrete mixture charged to said tank may be passed upwardly through pipe 38 and delivered into selector valve 40. With aperture 44 in registration with the straight section 41 of valve 40 the fluid concrete mixture is passed to pipe 50 wherein it is delivered to the mold section 3. As will be hereinafter more fully described, when the mold section 3 is completely filled with the concrete mixture valves 49 are so manipulated as to move the slide valve 43 to close communication between pipes 38 and 50 and open communication between pipe 38 and discharge pipe 51.

In carrying out my process the amount of the unit charge introduced into the tank 26 is in excess of the amount found necessary to completely fill the mold. Consequently, after the mold has been completely filled there still remains the excess concrete mixture in tank 26. In view of the fact that the concrete mixture 13 is of highly fluid consistency there is a tendency of the solid components of the mixture to settle and compact if the mixture is permitted to remain in a quiescent state for a predetermined period of time. Consequently, it is desirable that as soon as the mold is completely filled the excess concrete mixture which remains in tank 26 be immediately discharged therefrom through the discharge pipe 51. This prevents undesirable accumulation or compacting of the mixture at the lower portion of the tank 26. The excess concrete mixture discharged through pipe 51 may be caught in a suitable receptacle (not shown) and may be returned to the mixer 1.

Figure 3:
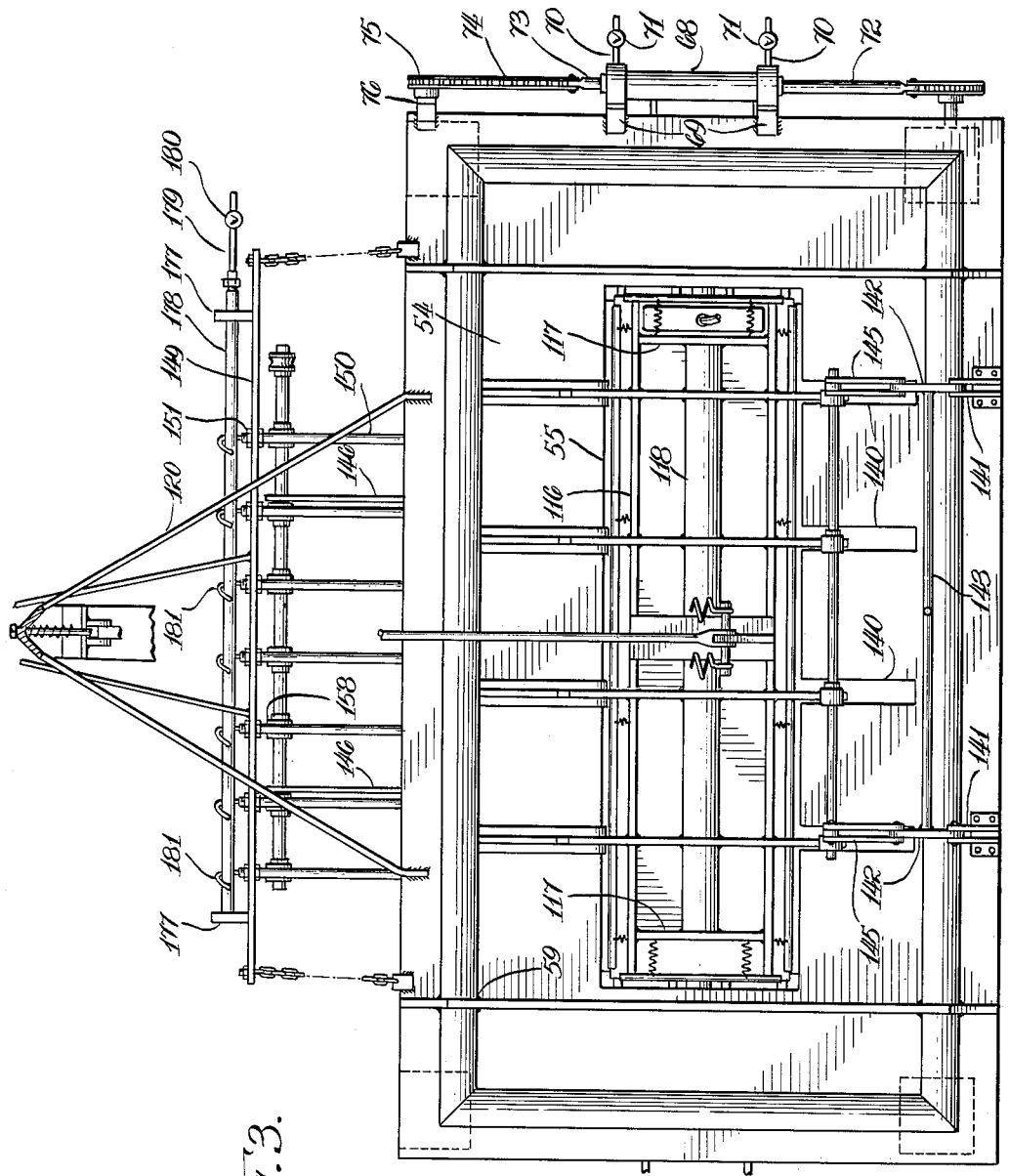
Fig. 3 is a top plan view of the molding section of the machine taken on line 3—3 of Fig. 2.
Figure 4:
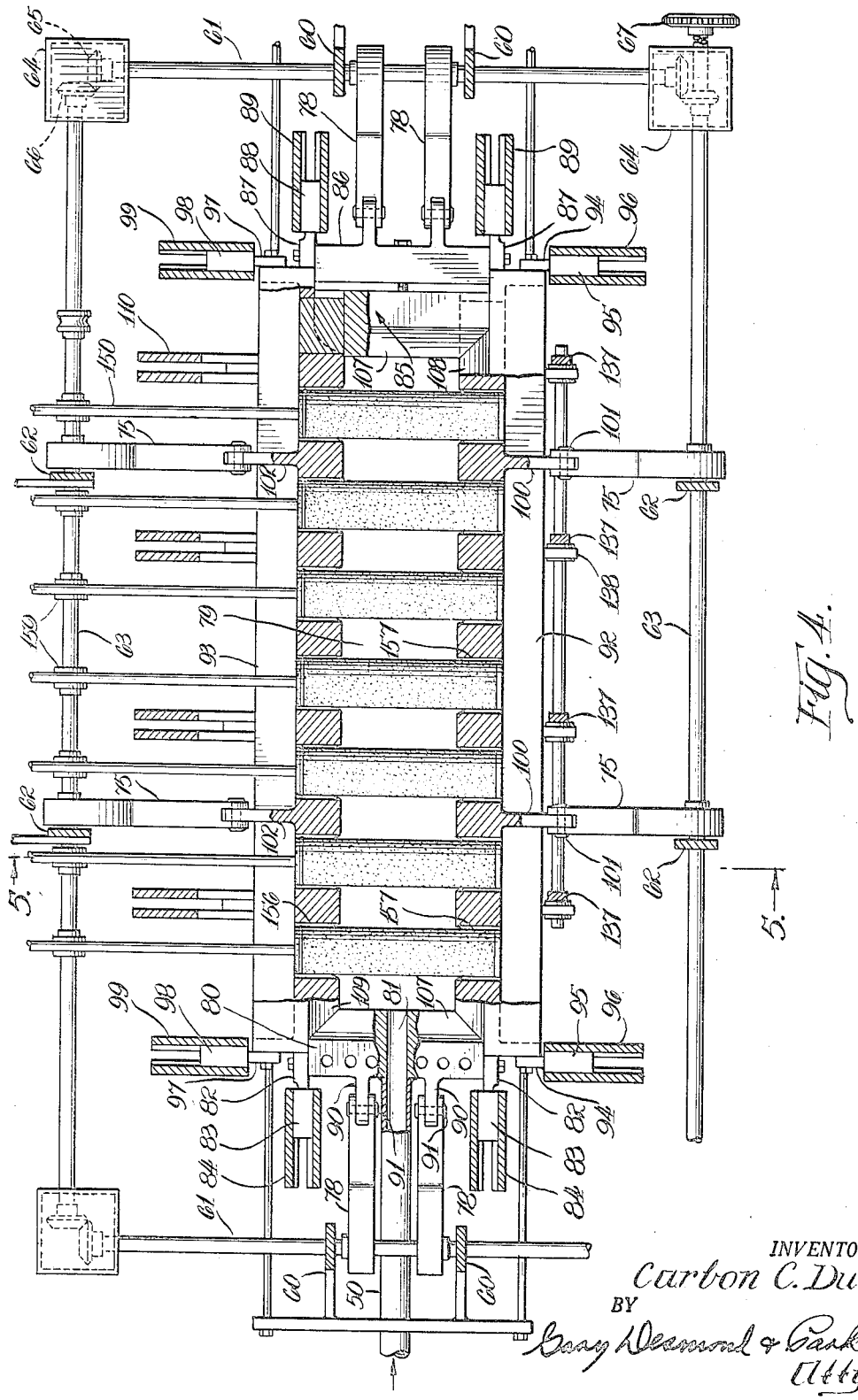
Fig. 4 is a horizontal sectional view of the molding section of the machine taken on line 4—4 of Fig. 1.

The mold section 3 comprises a frame 52 having supporting legs 53 and a platform or top portion 54. The platform 54 is provided at its central portion with an aperture or opening 55 (Figs. 1 and 3). To lend rigidity to the frame structure, particularly to the top portion 54 an endless structural tube 56 is carried upon the upper surface of the platform 54, said tube being rigidly secured at spaced intervals along its length to the top 54 as indicated best at 57 in Fig. 1. In addition, transverse ribs 58 are rigidly secured to the top 54, said ribs extending transversely across the width of the top 54 and being rigidly secured to the endless tube 56 as indicated best at 59 in Fig. 3. The ribs 58 are disposed adjacent the ends of opening 55.

In view of the fact that one of the important features of my invention resides in the molding of a concrete product to accurate dimensions the top 54 is rendered as rigid as possible to resist stresses which may tend to warp the top. As will be hereinafter more fully described, the top 54 carries the mold proper and functions to impart its rigidity to the mold.

A plurality of plates 60 are rigidly secured as by welding or the like to the lower surface of the top 54 of the frame 52, said plates being positioned adjacent the ends of the frame and being spaced from each other and extending downwardly from the lower surface of the top 54. A shaft 61 is journaled intermediate its length in each pair of plates 60, said shafts being disposed adjacent opposite ends of the frame and being positioned transversely of the frame. A plurality of plates 62 similar to plates 60 are rigidly mounted upon the lower surface of the top 54 and are adapted to function as journals for shafts 63, one of said shafts being positioned adjacent the front edge of the machine and beneath the top 54 and the other shaft being similarly positioned adjacent the rear edge of the machine. At the four corners of the machine housings 64 are carried, the ends of a pair of shafts 61 and 63 extending into each housing. Bevel gears 65 and 66 are carried at each of the ends of shafts 61 and 63, respectively, and a pair of bevel gears 65 and 66 match within each housing 64.

Shaft 63 at the front end of the machine projects exteriorly of a housing 64 and carries at its end a sprocket wheel 67. A pneumatic cylinder 68 (Fig. 3) is mounted by means of brackets 69 upon top 54. Pipes 70 connect into opposite ends of the cylinder 68 and at their opposite ends are connected to a source of fluid under pressure (not shown). A valve 71 is interposed in each pipe 70 to control the introduction or removal of fluid under pressure to or from the cylinder 68. The cylinder carries a single piston (not shown) and piston rods 72 and 73 extend outwardly from each end of the cylinder 68. The ends of a sprocket chain 74 are connected, respectively, to the ends of the piston rods 72 and 73. The sprocket chain 74 is trained around sprocket wheel 67 and is also trained around a sprocket wheel 75 journaled upon shaft 76 which, in turn, is rigidly mounted upon the top 54. The arrangement is such that by the proper manipulation of valves 71 sprocket wheel 67 may be rotated in a desired direction thereby rotating shaft 63 upon which said sprocket wheel is carried. Rotation of the last mentioned shaft results, by virtue of the intermeshing bevel gears 65 and 66, in simultaneous rotation of all of the shafts 61 and 63.

A pair of cam followers 75 are carried upon eccentrically mounted cams 76 (Fig. 5), the cams 76 being rigidly carried upon the shafts 63. The arrangement is such that rotation of the shafts 63 results in simultaneous inward or outward movement of the cam followers 75, that is, opposite cam followers move in opposite directions when the shafts 63 are rotated in a predetermined direction by sprocket wheel 67.

Similarly, a pair of cams 77 are mounted in spaced relationship with respect to each other upon each shaft 61, the cams 77 being eccentrically mounted upon said shafts. Cam followers 78 are associated with each cam 77 and the operation of the elements is such that opposite cam followers move in opposite directions when the shafts 61 are rotated in a predetermined direction by sprocket wheel 67.

As will be hereinafter more fully described, the operation of the mold proper resides in a mold whose side and end defining surfaces are movable toward and away from each other. The mechanism hereinbefore described comprising the rotating shafts 61 and 63 and the moving cam followers 75 and 78 comprise the actuating mechanism for moving the end and side edge portions of the mold.

The mold cavity 79 is defined by a top wall, bottom wall, opposite end edge walls and opposite side edge walls. One of the defining end edge walls comprises a block 80 provided with a substantially centrally located tubular aperture 81. Feed pipe 50 hereinbefore described connects into the aperture 81 whereby the concrete mixture from the tank 26 is passed into the interior 79 of the mold. Block 80 is carried by supporting plates 82 secured to opposite ends of the block. The upper ends of the plates 82 carry flanged blocks 83 which are slidably positioned in supporting guide members 84 carried upon the lower face of the top 54.

The opposite end edge member comprises a block 85 which is carried by and connects to a supporting block 86. As will be hereinafter more fully described, the distance between block 80 and block 85 determines the length of the concrete product which may be molded. If it is desired to mold a relatively short product the block 86 may be constructed of relatively thicker dimensions. To this extent the length of the product molded may be varied.

The supporting block 86 is rigidly secured to supporting brackets or plates 87 which terminate at their upper ends in flanged blocks 88. The flanged blocks 88 being slidably positioned in guides 89 carried on the lower face of the top 54.

Block 80 at one end of the mold carries spaced lugs 90 to which are pivotally connected by means of pivot pins 91 the ends of cam followers 78. The arrangement is such that when shafts 61 are rotated cams 77 function to reciprocate blocks 80 and 86 toward and away from each other.

The mold cavity is also defined by opposite edge members 92 and 93 constituting, respectively, the front edge member and the rear edge member. Supporting plates 94 are rigidly connected to the front edge member 92 and said plates terminate at their upper end in flanged blocks 95 which, in turn, are slidably supported by guides 96 carried upon the lower face of the top 54. Similarly, supporting plates 97 are rigidly connected to opposite ends of the rear edge member 93, said plates terminating at their upper ends in flanged blocks 98 which, in turn, are slidably supported in guides 99 mounted upon the lower face of the top 54.

The front edge member 92 carries spaced lugs 100 which are pivotally connected to the ends of one pair of cam followers 75 by means of pivot pins 101. The rear edge member 93 carries lugs 102 which are pivotally connected to the ends of a pair of cam followers 75. The arrangement is such that when shafts 63 are rotated cams 76 reciprocate the cam followers 75 to move the edge members 92 and 93 toward or away from each other. In this fashion all of the edge members can be moved inwardly to define the interior 79 of the mold and likewise all of said edge members may be moved outwardly, opposite edge members moving away from each other, to release the concrete product which may be molded in the interior 79 of the mold.

Referring particularly to Fig. 14 a perspective view of a concrete product is illustrated. The product illustrated comprises a block 103 having channels 104 at opposite ends and having channels 105 at opposite sides. The block is also provided with a plurality of substantially cylindrical openings 106 which extend transversely across the block and open to opposite channels 105. The openings 106 are uniformly spaced throughout the length of the block and the axes of the cylindrical openings are substantially parallel to the top and bottom surfaces of the block. Although my machine and process is illustrated and described in conjunction with the manufacture of a block such as block 103 it is to be understood that broadly my invention contemplates the formation or molding of a block of substantially any desired configuration.

In manufacturing the block 103 the channels 104 are formed by tapered projections 107 upon the inner edges of the end edge defining blocks 80 and 85, respectively, and the channels 105 are formed by similar tapered edges 108 and 109 formed upon the inner edges of the front and rear defining members 92 and 93, respectively. As will be hereinafter more fully described, the apertures 106 are formed by movable expansible core members which during the molding operation are disposed transversely across the mold interior.

The end edges and the side edges defining the interior 79 of the mold have hereinbefore been described. In addition thereto the interior 79 is also defined by a top closure plate and a bottom closure plate. A plurality of C-shaped members 110 are disposed in pairs along the length of the mold, the pairs of C-shaped members being spaced from each other and the members being rigidly secured to the lower surface of the top 54. Hingedly connected to the upper ends of the C-shaped members is a top closure assembly 111, and similarly connected to the lower ends of the C-shaped members is a bottom closure assembly 112.

The top closure assembly 111 comprises a closure plate 113. A plurality of transverse stiffening plates 114 are rigidly mounted upon the upper surface of the closure plate 113, said stiffening plates being spaced from each other and the ends thereof extending beyond the side edges of the closure plate 113. The rear ends of the transverse stiffening members 114 are pivotally connected by means of pivot pins 115 to the upper ends of the C-shaped members 110, each stiffening member being embraced by a pair of the C-shaped members 110. A plurality of longitudinal stiffening members 116 are also rigidly connected to the upper surface of the plate 113 adjacent the longitudinal edges of said plate. In addition, to further contribute to the rigidity of the plate 113 transverse end stiffening members 117 are rigidly mounted upon the upper surface of the plate 116 adjacent opposite ends of said plate. A tubular member 118 extends longitudinally substantially parallel and adjacent to the longitudinal axes of the closure plate 113, said tubular member being rigidly connected to all of the transverse stiffening members 114 and 117. For convenience in construction the parts hereinbefore described are preferably welded to each other.

In view of the fact that the upper closure plate 113 defines one face of the product 103, that is the face of relatively enlarged area, said plate must be maintained as flat as possible and must be so constructed that it will not readily warp. By the provision of the stiffening members 114, 116, 117, and the tubular member 118 the possibility of warping is rendered very remote.

The lower closure assembly 112 is substantially identical in construction to the upper closure assembly 111 and without further description reference numerals will be applied to the identical parts, the reference numerals being respectively primed.

Figure 2:
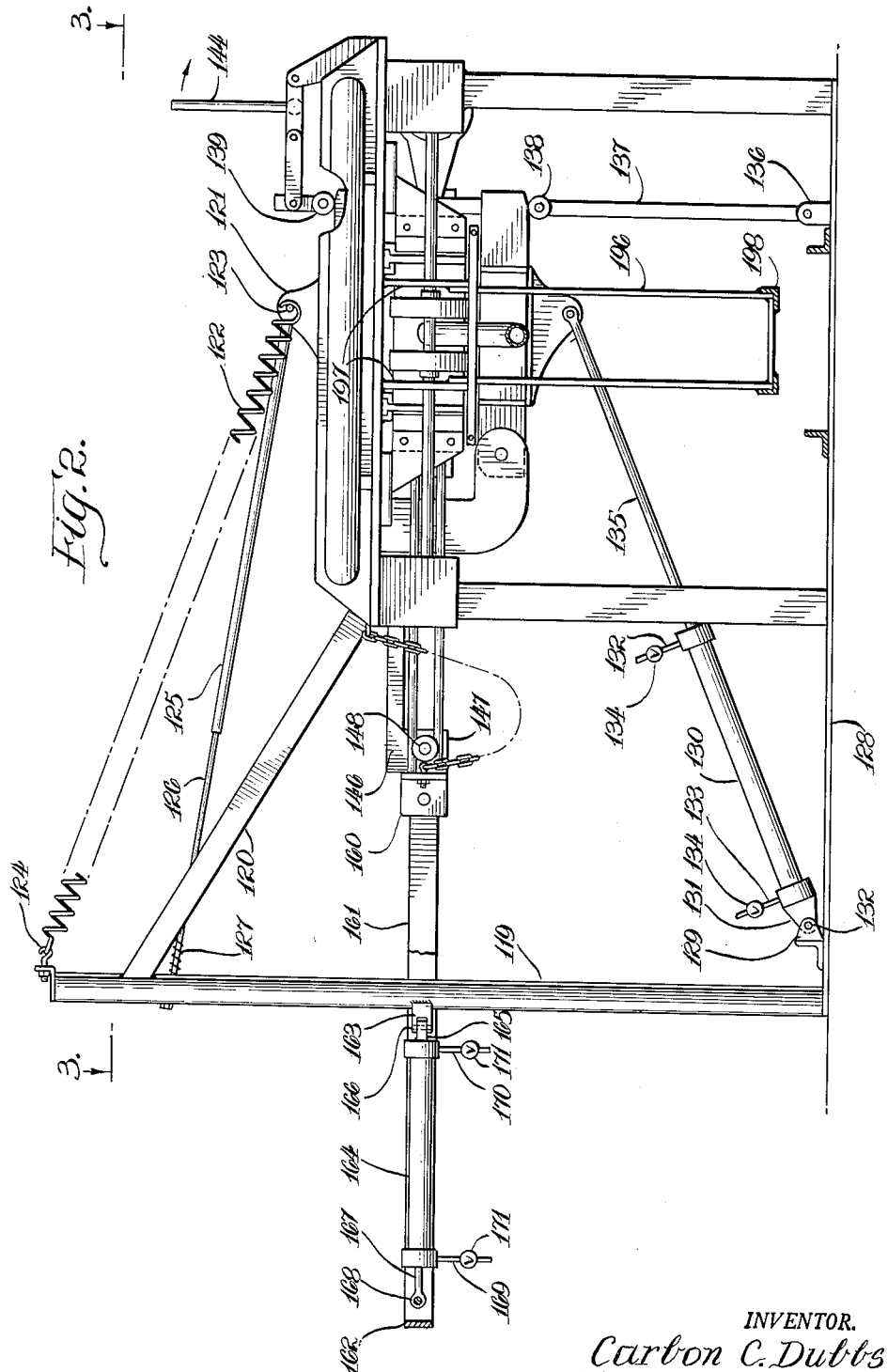
Fig. 2 is a transverse sectional view taken on line 2—2 of Fig. 1.

Referring particularly to Fig. 2, a standard 119 is disposed in upright position and spaced rearwardly from the frame 52. Adjacent the upper end of the standard 119 a V-shaped bracket 120 connects the standard to the top 54 of the molding section 3. A lug 121 is mounted upon the top closure assembly 111 and a coil spring 122 is connected at one end to a pin 123 carried by lug 121. At the opposite end the coil spring 122 is anchored upon hook 124 carried upon the upper end of standard 119.

The upper closure assembly 111 may be swung about at pivot pins 115 manually or by means of a suitable power arrangement (not shown). In either case the weight of the upper closure assembly is counterbalanced or biased by the coil spring 122 to facilitate raising and lowering of the upper closure assembly 111.

A tubular member 125 is pivotally connected at one end to pin 123 upon lug 121. A rod 126 telescopically engages the tubular member 125 and is swingably secured to the standard 119. A coil spring 127 embraces rod 126 adjacent the end thereof which is connected to the standard whereby swingable movement of the closure assembly 111 in a counterclockwise direction, as viewed in Figs. 2 and 5, brings the end of tube 125 into abutting relationship with the coil spring 127 whereby the limiting movement of the upper closure assembly is cushioned by the spring 127 so as not to unduly jar the mold when the upper closure assembly is opened.

A base frame strip 128 is mounted at the lower end of the machine and extends to the lower end of the standard 119 and is secured thereto. Adjacent the standard 119 the base frame member 128 carries a lug 129. A pneumatic cylinder 130 carries a lug 131 at one end thereof which is pivotally connected by pivot pin 132 to lug 129. Pipes 132 and 133 connect into opposite ends of cylinder 130, said pipes being connected to a suitable source of fluid under pressure (not shown). Valves 134 are connected, respectively, in each of the pipes 132 and 133 to control the introduction or discharge of fluid under pressure to and from the cylinder 130. A piston rod 135 is pivotally connected at its outer end to lug 121' carried upon the lower closure assembly 112 whereby manipulation of valves 134 functions to open or close the lower closure assembly 112 swinging said assembly about the pivot pins 115'.

A plurality of lugs 136 are mounted upon the base frame member 128 in spaced relationship from each other and a plurality of links 137 are pivotally secured at their lower ends to the lugs 136. Intermediate the length of each of the links 137 a roller 138 is carried. Similarly, adjacent the upper end of the links 137 a roller 139 is carried. The arrangement is such that when the upper and lower closure assemblies are in closed position counterclockwise movement of the links 137 bring rollers 138 and 139, respectively, into wedging or clamping contact with the lower and upper assembly members 114' and 114, respectively. The upper or top plate 54 is provided with a plurality of slots 140 to accommodate the upper ends of the links 137 in accomplishing their swingable movement.

A pair of lugs 141 are mounted in spaced relationship to each other upon the upper surface of the top 54 and a link 142 is pivotally connected to each of the lugs 141. The opposite links 142 are rigidly connected to the ends of a bar 143 which also carries a centrally disposed handle 144 (Fig. 2). The opposite ends of the links 142 are, in turn, pivotally connected to links 145 and, in turn, the opposite ends of said links 145 are pivotally connected to the upper ends of the two outermost links 137. It can readily be seen that clockwise or counter-clockwise movement of the handle 144 about the pivotal connection of links 142 with lugs 141 results in clockwise or counterclockwise movement of the members 137 to release or bring the rollers 138 and 139 into operative contact with the upper and lower closure assemblies. In this manner the closure plates 113 and 113' comprising portions of the upper and lower closure assemblies 111 and 112, respectively, are brought into firm contact with the opposite end edge members and the opposite side edge members hereinbefore described to completely close the mold space 79.

A pair of supporting arms 146 are mounted upon a pair of rear legs 53 of the machine, each of said arms having a downwardly extending projection 147. A rod 148 extends transversely with respect to arms 146 and is rigidly carried by the spaced projections 147.

A transverse frame 149 carries a plurality of pairs of spaced tubular members 150 along its length, each pair of tubular members being spaced from the next adjacent pair and being secured to said frame member by nuts 151. At the inner end of each pair of tubes 150 a circular plate 152 is mounted, said circular plate comprising one end of a cylinder having a metal wall 153. The opposite end of the cylinder is provided with a circular end 154. The cylinder 153 comprises the basic structure of a core indicated generally at 155 in Fig. 6, which, during operation of my process produces the substantially cylindrical openings 106 in the block 103 illustrated in Fig. 14.

As will be hereinafter more fully described, the cores 155 are moved inwardly and outwardly with respect to the interior of the mold 79. Hence, cylindrical openings 156 are provided in the rear defining edge member 93 of the mold, said cylindrical openings being spaced from each other along the length of the mold. Similarly, cylindrical openings 157 are provided in the front edge defining member 92 for the reception of the cylindrical cores 155. During operation of the machine the cores 155 are moved inwardly and outwardly through the apertures 156. When the cores are moved inwardly into the mold the ends of the cores are moved into apertures 157 whereby the cores completely bridge transversely the interior of the mold.

As has been hereinbefore described the cores 155 are carried upon the tubes 150 and that said tubes are, in turn, fixedly mounted upon plate 149. A plurality of grooved rollers 158 are loosely mounted upon rod 148 which is supported by the extensions 147 of the rearwardly extending arms 146. In addition, a plurality of rollers 159 are loosely mounted upon the rear drive shaft 63. The arrangement is such that the tubes 150 are disposed upon the tops and bottoms of the rollers 158 and 159 and are supported thereby when the tubes and cores move inwardly and outwardly with respect to the mold.

A pair of angle irons 160 are mounted in spaced relationship to each other upon bar 149. A strap 161 has its ends rigidly connected to the angle irons 160, the strap being bent intermediate its length to form in effect, the apex of a triangle, the apex being indicated at 162 in Fig. 2. A block 163 is rigidly secured to an intermediate portion of standard 119 and a pressure cylinder 164, having a lug 165 at one of its ends, is pivotally secured to the block 163 as at 166. The opposite end of the pressure cylinder carries a movable piston rod 167 which is pivotally secured to a retaining pin 168 mounted upon the strap 161 adjacent the apex 162. Pipes 169 and 170 connect, respectively, into opposite ends of the pressure cylinder 164, the opposite ends of said pipes being connected to a suitable source of fluid under pressure (not shown). A valve 171 is interposed in each pipe 169 and 170 whereby the introduction of fluid under pressure into cylinder 164 is controlled.

The arrangement is such that by the proper manipulation of valves 171 piston rod 167 may be caused to move outwardly or inwardly with respect to cylinder 169. This outward and inward movement of piston rod 167 is transmitted to strap 161 which, in turn, moves bar 149 outwardly and inwardly. In this fashion tubes 150 which are rigidly secured to bar 149 and also carry cores 155 are moved outwardly and inwardly with respect to the mold interior.

Referring particularly to Fig. 6, cylinder 153 is constructed of a rigid material such as metal or the like, embracing the cylinder 153 is a resilient cylinder 172. The cylinder 172 may be constructed of natural rubber or synthetic rubber or any other flexible, tough material. A sealing ring 173 clamps the cylinder 172 at one end around the circular plate 152 so as to maintain that end of the cylinder 172 fluid-tight. At the opposite end of the core a circular cap 174 having annular flange 175 is secured by means of screw 176 to the circular end 154. At this end of the core the metal cylinder 153 is turned inwardly providing a seat for the flexible cylinder 172 which may be clamped between cylinder 153 and flange 175 by tightening screw 176.

A pair of spaced supports 177 (Fig. 3) are mounted upon bar 149, said supports being adapted to carry a tubular header 178. The header 178 is closed at one end and is connected to a pipe 179 at its opposite end, pipe 179, in turn, being connected to a suitable source of fluid under pressure (not shown). A valve 180 interposed in pipe 179 functions to control the passage of fluid under pressure into the header 178. A plurality of feed pipes 181 connect into header 178, said feed pipes being positioned in the lowermost tube 150 of each pair of tubes which support the core. Each feed pipe 181 extends into the interior of the core 155 and is connected through an aperture 182 into the space provided between the flexible cylinder 172 and the rigid cylinder 153 comprising core 155. The arrangement is such that when fluid under pressure is introduced into header 178 said fluid enters the space between the flexible member 172 and the rigid member 153 thereby tending to expand the flexible member 172.

Referring particularly to Figs. 12 and 13, detailed views of the upper and lower closure plates 113 and 113' are shown. The plate 113 is provided on its inner face with a plurality of longitudinal recesses or channels 183. Similarly, the plate 113' is provided with longitudinal channels 183'. Connecting with said channels 183 and 183' are a plurality of bores 184. An inverted channel 185 is disposed transversely upon closure plate 113 and a similar channel 185' is disposed upon an end of the closure plate 113'. Openings 186 are provided in closure plate 113 adjacent the channel 185 whereby communication is established between the interior of the channel 185 and the longitudinal channels 183. Similarly, openings 186' are provided in closure plate 113' to afford communication between the interior of channels 183' and the interior of channel 185'. Channels 185 and 185' function as headers and the former connects with a pipe 187 and the latter connects with a similar pipe 187'. Each pipe 187 and 187' is provided with a control valve 188 and 188', respectively.

The arrangement is such that fluid under pressure may be introduced through pipe 187 into channels 183, the fluid passing longitudinally through said channels and being discharged through bores 184 into channels 183'. The fluid may then be discharged through pipe 187'. As will hereinafter be more fully described, either valve 188 or 188' may be closed and a vacuum may be established within the channels 183 and 183' or both valves 188 and 188' may be opened and the vacuum may be established through both pipes 187 and 187'.

Carried upon the inner face of closure plate 113 is a perforated or foraminous plate 189. Similarly, a perforated or foraminated plate 189' may be carried upon the inner face of closure plate 113'. In this manner communication is established between the channels 183 and 183' and the interior 79 of the mold. A flexible filter member 190 which may conveniently take the form of a relatively coarse woven fabric lines the inner face of the foraminous plate 189. The flexible filter member 190 may be carried around the edges of the closure plate 113 and may be resiliently anchored exteriorly of the mold by means of coil springs 191. Similarly, a filter member 190' lines the inner face of the foraminated plate 189' and is anchored exteriorly of the mold by means of coil springs 191'.

A groove is provided in the inner face of closure plate 113 adjacent the edges of said plate, said groove being adapted to carry a flexible packing or sealing material 192. Similarly, a sealing material 192' is carried by the lower closure plate 113'. The sealing materials 192 and 192', when the closure plates are in closed position bear upon the edge defining members 80, 86, 92 and 93. It can readily be seen that when the edge defining members are in closed position as hereinafter described and the upper and lower closure plates are seated in closed position the clamping rollers 138 and 139 compress the seals 192 and 192' to render the mold interior 79 substantially fluid-tight. Referring particularly to Fig. 1, it will be noted that pipe 50 and pipe 38 are rigidly connected together and that pipe 50 is rigidly connected to the end defining member 80. To provide for movement of the end defining member 80 the feed assembly 2 including tank 26 is rendered movable with the movement of the end defining member 80. To accomplish this operation tank 26 is carried upon a platform 193 which, in turn, is supported upon wheels 194. A pair of longitudinal rails 195 are positioned beneath the mold section 3 and also the feed section 2, the wheels 194 resting upon and being guided for longitudinal movement along the rails 195. Assembly 196 (Figs. 1 and 2) is secured at its upper end to plates 197 which, in turn, are carried by the end defining member 80. The lower end of the frame assembly 196 is connected by means of angle irons 198 to platform 193 upon which the feed assembly is carried. The arrangement is such that when the end defining member 80 moves inwardly and outwardly the feed assembly 2 is similarly moved, the feed assembly being guided by the cooperation of the wheels 194 and rails 195.

In carrying out my invention and performing the process on the apparatus hereinbefore described, a concrete mixture comprising cement, a properly graded aggregate and water is prepared. In view of the fact that my process contemplates transporting the mixed concrete from the feed section to the mold section through a conduit or pipe it is essential that the mixture be relatively fluid so that it can be readily passed through said pipe or conduit. For example, I have found that a concrete mixture comprising one part, by volume, of cement to four parts, by loose shook volume, o three-eighths inch to pan pumice to 1.65 parts of water may be introduced and mixed in the mixer 1.

After the components have been properly mixed in the mixer a predetermined quantity of the mix is passed through the conduit 12 into hopper 28, the volume of the mix being controlled by the proper manipulation of the valves 14 and 20. At this period of the operation valve 32 is opened under the influence of the spring carried in the housing 35 and hence the mixture is thus charged into the tank 26.

After the mixture has been introduced into the tank 26 valve 32 is closed by the upward movement of piston 31 controlled by valve 34. Fluid under pressure is then introduced into the upper portion of tank 26 thereby establishing a condition of super-atmospheric pressure within the tank. The pressure within tank 26 forces the relatively fluid mixture upwardly through pipe 39 and when valve 43 is so positioned as to afford communication to pipe 50 the mixture is forced into pipe 50 and is thereby passed into the interior 79 of the mold. Of course, prior to the introduction of the mixture into the mold, the defining elements comprising the mold are all in closed relationship to each other and the cores 155 are disposed in operative position in the mold interior. I have found that in employing the concrete mixture hereinbefore described a pressure of approximately 55 pounds per square inch is suitable for delivering the mixture from the tank into the mold. As has been hereinbefore described it is desirable that the volume of concrete mixture available in tank 26 be in excess of the volume of the mold, taking into consideration, of course, that a portion of the liquid carrier, during the molding operation, is removed from the material in the mold.

Prior to the introduction of the concrete mixture into the mold a degree of pressure is established within the cores 155 whereby the flexible cylinder 172 bulges to a sufficient extent as to have the walls of said cylinder seal the openings 156 and 157 in the side edge members 93 and 92 respectively. In this manner the components of the concrete mixture being introduced into the mold do not leak from the mold through the openings 156 and 157. During the phase of operation wherein the mixture is entering the mold, the mold is vented through either of the pipes 187 or 187' whereby a condition of atmospheric pressure is maintained in the mold interior. Normally, when the mold is initially completely filled with the concrete mixture such fact will be evident by the discharge of water through pipe 187'.

When the mold is initially completely filled valve 180 is manipulated to permit the introduction of fluid under pressure into header 178 and by means of pipes 181 said fluid enters the space in the cores 155 between cylinder 153 and the flexible tubing 172 which embraces said cylinder. As the pressure in this latter space increases the flexible tube 172 bulges outwardly and tends to pressurize or compact the mixture within the mold.

In establishing the pressure within the expansible cores 155 the mixture within the mold is subject to a pressure which tends to express water from the mixture through the flexible filter element 190 and 190' and the foraminated plates 189 and 189'. At this period in the operation fluid under pressure is introduced through pipe 187 and said fluid is transmitted through the channels 183 thereby forcibly removing the water expressed through the foraminated plate 189. The fluid under pressure thus introduced passes through bores 184 to channels 183' thereby removing expressed water which may have passed through the foraminated plate 189'. The fluid and liquid thus moving through the various channels hereinbefore described is discharged through pipe 187'.

Initially upon the passage of fluid under pressure through the system hereinbefore described, a large quantity of water is discharged from pipe 187'. As the compaction of the concrete mixture within the mold proceeds the water discharged through pipe 187' diminishes. When the water discharged through pipe 187' has diminished substantially the passage of fluid under pressure into pipe 187 is stopped by closing valve 188. Pipe 187' is then connected to a vacuum pump (not shown) whereby a condition of vacuum is established in channels 183' and 183. When the maximum vacuum has been established within the channels 183' and 183 valve 43 is closed and the excess concrete mixture within tank 26 is discharged through pipe 51. In this manner the excess concrete mixture is removed from tank 26 before it has an opportunity to become packed.

It can readily be seen that by establishing vacuum within channels 183' and 183 additional water is drawn from the concrete mixture within the mold and further densification of the mixture takes place.

If desired my process may be carried out by eliminating the step of introducing fluid under pressure through pipe 187 into channels 183 and 183' and the water expressed from the mixture in the mold may be substantially entirely removed by the use of vacuum as hereinbefore described.

I have found that although the concrete mixture originally prepared contains so great an excess of water as to render the mixture unsuitable for use as such, that after densification or compaction of this mixture within the mold the resulting compact mixture contains water to a proportion which is adequate to produce a relatively strong resulting product.

After the desired quantity of water has been removed from the compact mixture the suction applied to the formed mixture is stopped and the product contained within the mold is then ready for removal. In view of the fact that the compact mixture is compressed into intimate contact with the filter members 190 and 190', the texture of said members is influential in determining the texture of the surfaces of the product brought into contact therewith. This fact affords a convenient means of control of the texture of the flat surfaces of the product and such texture may be changed from relatively coarse to relatively fine texture. In addition, the filter members afford a medium for imparting desired designs to the surface of the product.

Referring particularly to Figs. 7 to 11 inclusive, the sequence of operation in loading the mold is illustrated. In Fig. 7 the elements comprising the mold are shown in separated relationship with the upper closure plate raised and the lower closure plate lowered. The expansible core 155 being disposed in its retracted position relative to the mold. In Fig. 8 the edge defining portions of the mold are in closed relationship and in Fig. 9 the upper and lower closure plates are in closed position and the expansible core is positioned within the mold cavity. Fig. 10 is substantially the same as Fig. 9 except that subsequent to the phase illustrated in Fig. 9 fluid under relatively low pressure has been introduced into the expansible core so that the ends of said core form a seal with the defining walls of the openings 156 and 157. In Fig. 11, with all of the mold elements in closed position and after the core has been initially expanded, the concrete mixture is introduced into the mold cavity and the cores are expanded to exert the compacting pressure upon the mixture as has been hereinbefore described.

After the concrete mixture within the mold has been compacted or densified and the excess water removed from the mold the compacted product is ready for removal from the mold. The initial step in removing the formed product from the mold comprises releasing the pressure within the cores thereby deflating said cores. This permits the ready removal of the cores and the next step in sequence involves properly manipulating valves 171 associated with fluid pressure cylinder 164 to retract the cores from the mold. After the cores have been retracted from the mold the vacuum within the channels 183 and 183' is broken.

The handle 144 may then be manipulated by moving said handle clockwise, as viewed in Fig. 2, whereby the linkage assembly 137 is moved clockwise functioning to disengage rollers 138 and 139 from the lower and upper closure assemblies, respectively. The upper closure assembly 111 may then be swung about pivots 115 to raised position and valves 134 associated with pressure cylinder 130 may be manipulated to retract piston rod 135 thereby swinging the lower closure assembly 112 about pivots 115'.

With the lower portion of the mold removed a suitable pallet (not shown) may be positioned beneath the then exposed product 103, said pallet being supported in substantial contact with the lower face of the product. Valves 71 associated with pressure cylinder 68 may then be manipulated to rotate sprocket wheel 67 whereby shafts 61 and 63 are rotated. As has been hereinbefore described, rotation of said shafts results in simultaneous outward movement of the cam followers 75 and 78 which, in turn, results in opposite outward movement of the side edge defining members 92 and 93 and the edge defining members 80 and 85. The product 103 is thereby released from the mold and is supported upon the pallet. Subsequently the pallet may be removed and inasmuch as the product has been densified and excess water expressed therefrom it has been found that the product may be handled without danger of slumping or disintegrating. The cycle of operations may then be repeated.

It is to be understood, of course, that the proportions of the concrete mixture hereinbefore set forth are merely proposed for purposes of example. It is to be further understood that such proportions may be varied throughout relatively wide limits depending upon material employed and other conditions of operation. It should be clearly understood that the purpose of the excess water in the concrete is that of providing a vehicle for transporting and depositing the solid components and the necessary water of hydration to the desired location in the mold. In order that the water may serve as a vehicle it is necessary that the solid components be effectively in a substantially suspended state in the vehicle and must remain in a substantially suspended state from the time the material is ready to move from the mixing machinery to the mold and to final position within the mold. This applies not only to the mass as a whole, before and during its passage to the mold, but also to the mass which has been introduced into the mold. In this connection it must be borne in mind that the solid components may tend undesirably to float within the vehicle or settle within the vehicle depending upon their specific gravities relative to that of the vehicle.

In the construction of the apparatus and the operation of the process, such as has been hereinbefore described, two factors must be borne in mind: (1) How long the solid components of the mix will stay in suspension when the mix is quiescent. (2) What tends to bring about segregation within the mix when the mix is in motion.

As to the first of the factors enumerated hereinabove, the stability of a quiescent suspension is influenced by the following: (a) The specific gravity of the solid components relative to the specific gravity of the suspending vehicle; (b) The size of the solid components; and (c) The amount of suspended vehicle used relative to the amount of solid components. For illustration, the specific gravity of cement is in the neighborhood of 3 and yet can be kept in temporary suspension fairly easily because the fineness of particle size inhibits settling. Gravel, with a specific gravity of approximately 2.66, is diffiuclt to keep in suspension primarily because of its relatively large particle size, and yet gravel, stone or other heavy materials may be kept in a cement suspension for a considerable length of time by reducing the amount of water to the point where in effect the gravel is suspended in a paste of cement and water. When, for example, an aggregate having an apparent specific gravity in the neighborhood of 1 is used, larger quantities of water can be used as a vehicle without seriously cutting the length of time that the mix will behave substantially as a suspension.

In light of the above, it can be generally said that as the specific gravity of the solid components approaches 1 more water can be used as a vehicle. As the specific gravity of the solid components depart from 1, less water can be used. If large amounts of water are used with heavy components, then the whole action of transporting and placing must transpire in a time so short that the heavy aggregates will not have time to settle. The mere fact that the aggregates tend to rapidly separate out of the suspension does not interfere with the operation of the process as long as the operation, such as the delivery of the mix to the mold, is carried forth with such speed as to prohibit any substantial portion of the heavy aggregates from actually completing the settling-out process.

As to the second of the factors hereinbefore set forth which was "What tends to bring about segregation within the mix when the mix is in motion": Presuming the solid components of the mix are in suspension this mix will behave much as a liquid while in a relatively static condition, that is, it will readily take the shape of a confining vessel and pressure applied at one part of the mix will be substantially transmitted simultaneously to all other parts of the mix. The kinetic aspects of the suspension in motion vary from the kinetic aspects of a true fluid in motion, that is, under certain conditions a sudden change in velocity of the suspending vehicle will tend to solidify or cake the solid particles since through friction and inertia they tend to lag behind the water in movement and the subsequent current developed between particles tends to reduce fluid pressure and bring the particles together.

In somewhat the same manner any substantial changes in cross-sectional area of conducting pipes will tend to cause segregation where no difficulty would be encountered in the passage of a true fluid. Therefore, it is desirable to have substantially uniform cross-section of conducting pipes and valves. Sudden changes in direction of flow also tend to cause segregation and it is therefore desirable that pipe bends be as gradual in curvature as possible.

Accordingly, in carrying out my process it is desirable that all of the above factors be considered in the construction and operation of my invention. In general, it becomes apparent that with suspensions carrying components having specific gravities in the neighborhood of 1 slower speeds may be used in transfer of mixture, the mixture can be left in a quiescent state for longer periods without undesirable segregation and sharper bends and longer runs can be used in the pipe system. As the suspended materials become heavier shorter runs of pipe and more rapid handling of the mixture become essential and in certain cases it is necessary to provide additional agitation for mixing during the handling process, such as, the provision of an agitating device in the tank 26.

In view of the problems mentioned hereinbefore I prefer to use light weight aggregates in carrying out my invention. The following aggregates have been found to be suitable; pumice, exfoliated mica, expanded perlite, and other types of processed aggregates, such as, shales, slags, and clays. Pumice is a particularly suitable material and I have found an aggregate gradation from three-eighths inch to pan an excellent selection for use in a machine employing my invention where pipe sizes are approximately two inches in internal diameter. With this material I find that a pressure in the neighborhood of fifty-five pounds to the square inch in the tank 26 is satisfactory.

Actually a pressure of a relatively few pounds to the square inch is normally sufficient to keep the material in motion once it has begun to flow but, due to the fact that the concrete mixtures contemplated are not stable suspensions, relatively high initial pressures are normally required to start the mixture in motion. This is probably due to the tendency of the aggregate to settle and the fact that the mixture exhibits thixotropic properties. The use of substantially any sized aggregate is contemplated in the operation of my invention; however I have found that a maximum aggregate size of about one-third the pipe diameter is suitable. In the use of heavy aggregates I have found it advisable to increase feed tank pressures as well as the speed of handling.

One of the essentials in the selection of the filtering members 190 and 190' is that they must be foraminous to a degree which will allow relatively free passage of water. In addition to this characteristic the interstices are preferably sufficiently large to permit the passage of fine materials from the concrete mixture, since the ability to pass fine materials through its interstices in company with the water determines the number of reuses which may be made of the filter members without cleaning. Although the interstices of the members 190 and 190' permit the passage of fines including some cement particles, this removal of cement particles appears to be controlled by the characteristics of the mixture and an excess amount of cement is not lost in this fashion. On the other hand to decrease the amount of cement particle concentration at the surfaces of the product works to advantage to the utility of the product, since undesirable crazing and "dusting" of the product surfaces during use is thereby diminished. The upper size limit of the interstices is determined primarily by the finish desired on the block and by the predetermined allowable quantities of fine materials which may be permitted to pass. In the event a material having very small interstices is used it has been found that an affinity develops between the foraminous surface and the surface of the block in contact therewith. It is believed that this affinity is due to the progressive collecting of fine materials within the relatively small interstices of the filtering material and on the surface of this material thereby reducing the rate of liquid flow through the material and building up, in effect, a very fine filtering medium composed of accumulated particles. The essential difficulty which occurs when this condition is reached is that when the product is demolded the apparent attraction between the filtering material and the surface of the product causes undesirable disruption of the surface of the product.

I have found in the operation of my process that ordinary linen crash is an acceptable fibrous material for providing a desirable surface. I can also obtain a relatively smooth surface by the use of 100-mesh stainless steel wire cloth. A rough stucco like surface may be obtained by the use of ordinary terry cloth such as is used in the manufacture of bath towels.

It is to be understood that a machine employing my invention will operate with pressure on the expansible cores 155 and without vacuum in the channels 183 and 183' or with vacuum in said channels and without expandable core pressure. This latter is believed to be so when relatively large areas of the product are subjected to vacuum and preferably when the vacuum is applied to opposite surfaces of the product. However such operation is relatively slower and produces a product which does not possess as desirable properties as are produced when core pressure and vacuum are both employed.

Core pressure may be varied from a relatively low pressure of a few pounds to the square inch up to the safe working limits of the equipment, depending upon the speed of operation and the degree of compaction desired. A satisfactory core pressure for use with the above described pumice aggregate was found to be approximately forty pounds to the square inch.

The primary purpose of the expansible core is to compact the mixture and expel excess water from the mixture and to also, at the low pressure stage, seal the openings 156 and 157. The air blast passed through the channels 183 and 183' removes the expressed water from the situs of the block surfaces. The vacuum serves as a scavenging medium to remove additional water from the product surfaces and to pull additional water from the interstices of the interior of the product, but without the compaction obtained from expanding cores the product may have a relatively large amount of void space.

I claim as my invention:

1. An apparatus for molding concrete products which comprises in combination, a closed receptacle for holding a bulk supply of a concrete mix containing an excess of water, an enclosed mold, means for establishing superatmospheric pressure in said receptacle, pipe means connecting said receptacle to said mold to pass a portion of said mix to said mold to fill said mold, means for simultaneously blocking the flow of mix from the receptacle to the mold when the mold is filled and discharging the remaining portion of the mix from the receptacle, means within said mold for establishing a condition of superatmospheric pressure within the mix in the mold to express excess water from the mix, means within the mold for segregating said excess water from the mix, and means for discharging said excess water from the mold.

2. An apparatus for molding concrete products which comprises in combination, a receptacle for holding a bulk supply of a concrete mix containing an excess of water, a closed mold having a top, a bottom and opposite side and end edges, means for passing a portion of said mix to said mold to fill said mold, means within said mold for establishing a condition of superatmospheric pressure within the mix in the mold to express excess water from the mix, means within the mold for segregating said excess water from the mix, means for discharging said water from the mold, means for raising the top of said mold and means for lowering the bottom of the mold to expose two opposite faces of the molded product, and means for simultaneously moving said side edges and end edges at right angles to their respective lengths oppositely away from each other to release the product from the mold.

3. An apparatus for molding concrete products which comprises in combination, a receptacle for holding a bulk supply of a flowable concrete mix containing an excess of water, a closed mold having a mold compartment of greater width and length than thickness, means for passing a portion of said mix from said receptacle to said mold to substantially fill the same, means forming a part of said mold and disposed within said mold for compacting said mix and expelling excess water therefrom, means within the mold for segregating said excess water from the mix, hinges carried upon edges of said mold on opposite sides of the thickness of said compartment, the opposite sides of greatest area of said mold being swingably carried by said hinges, means for swinging said opposite sides about said hinges to expose opposite faces of said molded product, and means for moving other sides of said mold at substantially right-angles to their respective lengths to release the product from the mold.

4. An apparatus for molding concrete products which comprises in combination, a receptacle for holding a bulk supply of a concrete mix containing an excess of water, a closed mold having a top, a bottom, and separate side edges and separate opposite end edges, means for passing a portion of said mix to said mold to fill said mold, means within said mold for establishing a condition of superatmospheric pressure within the mix in the mold to express excess water from the mix, means within the mold for segregating said excess water from the mix, means for discharging said water from the mold, means for raising the top of said mold and means for lowering the bottom of the mold to expose two opposite faces of the molded product, and means for simultaneously moving said separate side edges and separate end edges respectively away from each other transversely to their length to release the product from the mold.

5. An apparatus for molding concrete products which comprises in combination, a receptacle for holding a bulk supply of a flowable concrete mix containing an excess of water, a closed mold having a mold compartment of greater width and length than thickness, means for passing a portion of said mix from said receptacle to said mold to substantially fill the same, means forming a part of said mold and disposed within said mold for compacting said mix and expelling excess water therefrom, means within the mold for segregating said excess water from the mix, hinges carried upon edges of said mold on opposite sides of the thickness of said compartment, means connecting the opposite sides of greatest area of said mold to said hinges, means for moving said opposite sides about said hinges to expose faces of said molded product and means for moving other sides of said mold transversely to their respective lengths to release the product from the mold.

References Cited in the file of this patent

UNITED STATES PATENTS

| Number | Name | Date |
|---|---|---|
| 930,053 | Diefendorf | Aug. 3, 1909 |
| 1,492,642 | Lake | May 6, 1924 |
| 1,552,064 | Lake | Sept. 1, 1925 |
| 2,177,221 | Mull | Oct. 24, 1939 |
| 2,311,358 | Baily | Feb. 16, 1943 |
| 2,313,110 | Wertz | Mar. 9, 1943 |
| 2,427,044 | Burns | Sept. 9, 1947 |
| 2,474,721 | Billner | June 28, 1949 |
| 2,542,874 | Locatelli | Feb. 20, 1951 |
| 2,612,673 | Billner | Oct. 7, 1952 |
| 2,628,402 | Billner | Feb. 17, 1953 |